United States Patent
Brennan

[11] 3,888,520
[45] June 10, 1975

[54] LANCE SUPPORTING COUPLING

[75] Inventor: James H. Brennan, Monroeville, Pa.

[73] Assignee: Pittsburgh Brass Manufacturing Company, Irwin, Pa.

[22] Filed: Aug. 22, 1974

[21] Appl. No.: 499,705

[52] U.S. Cl. ............... 285/310; 285/318; 285/321; 285/340; 285/351
[51] Int. Cl. ............................................. F16l 37/22
[58] Field of Search .......... 285/340, 310, 318, 244, 285/DIG. 3, 39, 321, 351, 394; 403/362, 370

[56] References Cited
UNITED STATES PATENTS

| | | | |
|---|---|---|---|
| 2,806,723 | 9/1957 | Fairclough | 285/DIG. 3 |
| 2,950,132 | 8/1960 | Kocsuta | 285/321 X |
| 3,065,005 | 11/1962 | Hall et al. | 285/318 X |
| 3,406,990 | 10/1968 | Brennan | 285/310 |
| 3,603,619 | 9/1971 | Bengesser | 285/321 |

Primary Examiner—Thomas F. Callaghan
Attorney, Agent, or Firm—Parmelee, Miller, Welsh & Kratz

[57] ABSTRACT

A positive latching and easily releasable coupling of simplified construction is provided for a smooth wall fluid delivering tubing or pipe member, such as an oxygen lance. The coupling employs a short-length combined locking ring and spring element of substantially rectangular section that is directly canted by an adjustment screw and is securely retained in a tube retaining position by spreading action of the ring.

11 Claims, 7 Drawing Figures

PATENTED JUN 10 1975 3,888,520
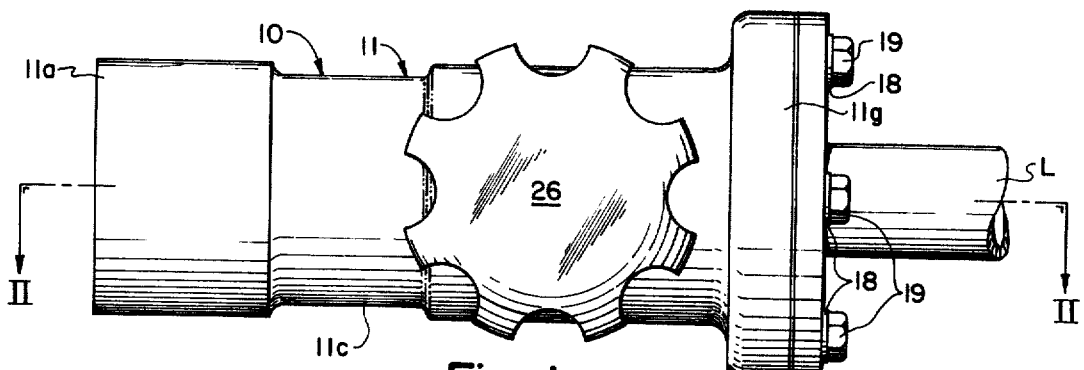
Fig. 1
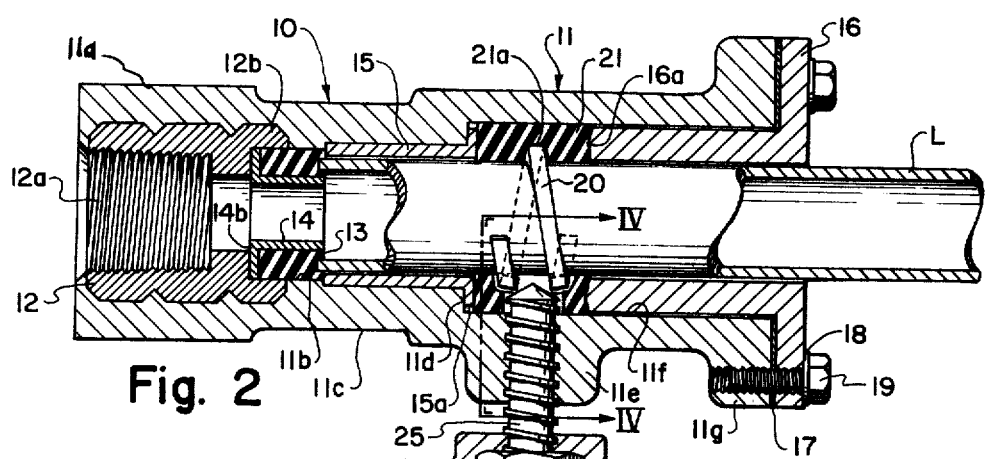
Fig. 2
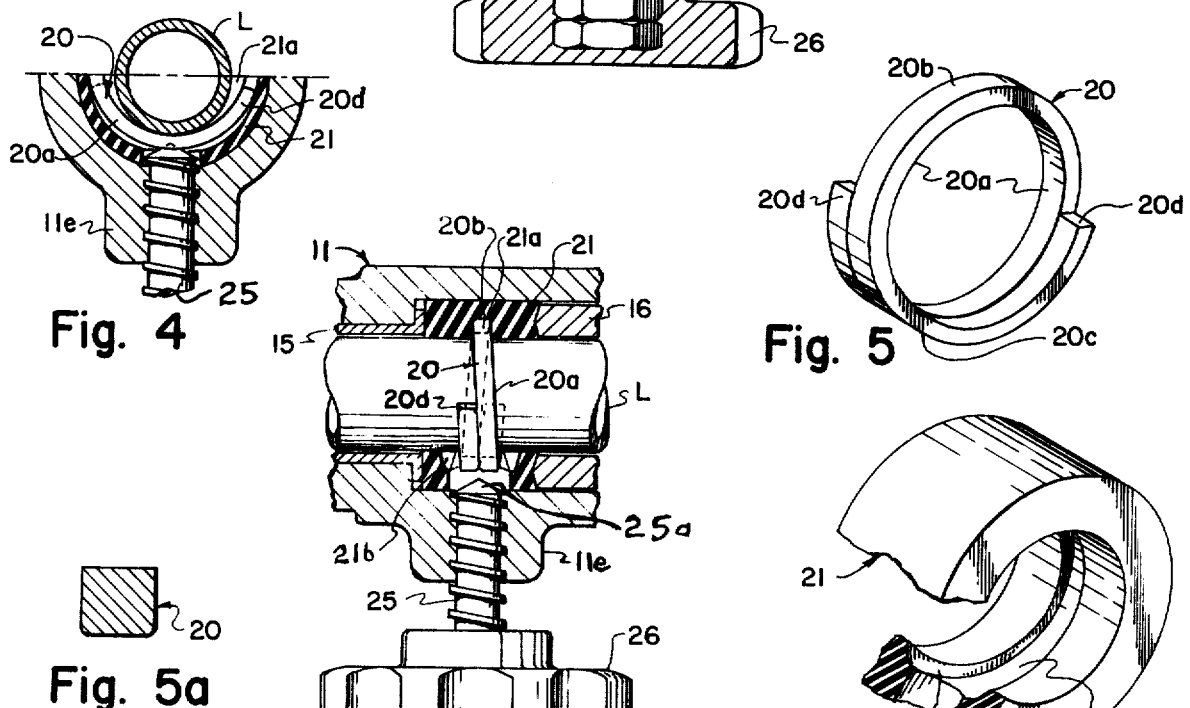
Fig. 3
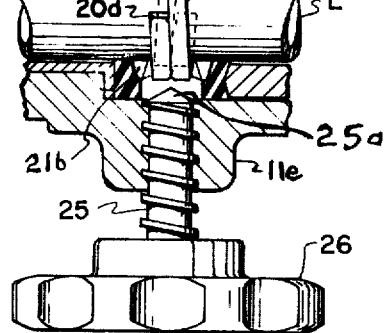
Fig. 4
Fig. 5a
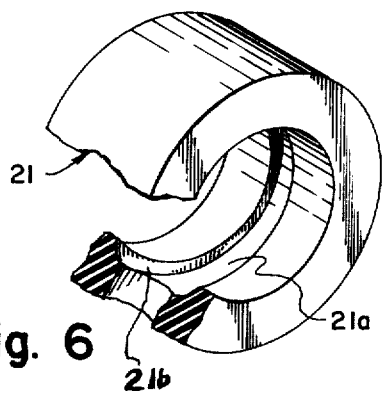
Fig. 5
Fig. 6

3,888,520

1

LANCE SUPPORTING COUPLING

BACKGROUND OF THE INVENTION

1. Field of the Invention

This invention pertains to an improved, simplified coupling for positively retaining and quickly releasing a fluid delivering, feeding tube or pipe member and particularly, to a fluid sealing-off holder coupling for an oxygen lance or the like that requires only one screw operating means.

2. Description of the Prior Art

Heretofore, as exemplified by U.S. Pat. No. 3,406,990, a better quality holder type of coupling has made use of a spring-positioned canting ring that is (see FIG. 5 of the patent) canted into a locking position by one screw and prevented from accidental release under a jarring force or hard blow by a second screw means. Earlier types of couplings were not foolproof in their usage and in fact were dangerous because of their somewhat superficial or not fully positive tube gripping action. This gave rise to a hazard, since a metal processing or cutting fluid such as oxygen is usually supplied under considerable pressure. Thus, an accidental release of the holding action during fluid delivery usage, tends to make the supply or delivery pipe act like a projectile. In view of the above, there is the need for a simplified but rugged type of holder coupling that will be fully positive and safe in its locking action and that will also be substantially leak-proof from the standpoint of the fluid or gas being supplied.

SUMMARY OF THE INVENTION

It has thus been an object of the present invention to devise an improved, positive retention coupling for a fluid-carrying pipe or tubing member.

Another object has been to provide a safe but simplified holding-supporting coupling for quickly-releasably and positively carrying a lance-like pipe member in a fluid sealed-off relation with respect to a supply line.

A further object has been to devise a simplified coupling for oxygen lance and other similar usage that will provide an improved sealing-off of the joint between it and the end of a lance, and that will assure a positive grip of the lance under operating conditions and until manually released.

These and other objects will appear to those skilled in the art from the illustrated embodiment and the claims.

BRIEF DESCRIPTION OF THE DRAWINGS

In the drawings, FIG. 1 is a side view of a coupling embodying the invention; in this view, a fluid delivering pipe member is shown in position therein;

FIG. 2 is a longitudinal section taken along and on the same scale as FIG. 1; in this view, a locking element is shown canted into locking engagement with the pipe member;

FIG. 3 is a fragmental side section similar to FIG. 2, but showing the locking element in a released position with respect to the pipe member;

FIG. 4 is a fragmental section on the same scale as and taken along the line IV—IV of FIG. 2;

FIG. 5 is an enlarged isometric view showing a suitable normal relaxed relation of the wings or convolutions of the locking element;

FIG 5a is a further enlarged section taken across the locking element of FIG. 5;

2 and, FIG. 6 is an enlarged, partially broken away isometric view on the scale of FIG. 5 showing details of the construction of a positioning washer for the ring.

DESCRIPTION OF THE PREFERRED EMBODIMENT

In employing a coupling 10 shown in the drawings, a longitudinally or axially extending housing body 11 is adapted to have its central bore securely connected at its upstream, back or inlet end portion 11a to the threaded male end of a gas or fluid supply line (not shown). A fixed grommet or connector sleeve 12 is shown integrally secured as by casting within a back end portion of the bore that is located within a rear housing portion 11a; its threaded female bore 12a serves to receive the male end of the fluid or gas supply line.

A socket or retention recess is provided for an elastomer, first or primary annular sealing ring or gasket 13 (shown of rectangular section) by a ledge-like, offset front end 12b of the connector sleeve 12, a shoulder or ledge provided by a reduced diameter portion 11b of the housing, and by a loose grommet or positioning sleeve 14 of angle-shaped section. The grommet or sleeve 14 has a transverse flange 14b that is adapted to abut against a backwardly offset portion of the front end 12b to, with its sleeve body, provide a positioning wall for the inner diameter or side as well as the back end of the primary gasket 13. A slide sleeve 15, also of angular section, is carried by the bore of a central portion 11c of the housing and at its back end, rests against the frontmost edge of the housing portion 11b and, at its front end flange 15a, rests against an abutment shoulder or edge 11d in the bore of the housing. It will be noted that an inner diameter portion of the back end of the sleeve 15 is adapted to engage an outer diameter portion of the front end of the gasket 13 to retain it in position within the housing when the pipe member L has been removed from the housing of the coupling 10.

A central, annular recess is provided within enlarged bore of front or downstream end portion 11f of the housing within which a closure cap or sleeve 16 of angle-shaped section is adapted to extend. A central, annular, gasket receiving recess is defined within the bore of the portion 11f between front flange 15a of the slide sleeve 15 and a back end 16a of the closure sleeve 16. As shown, the end 16a has a somewhat blunt, wedge-like shape, represented by a central apex that defines a complementary position-retaining fit within a slightly recessed front end portion of an elastomer, second or secondary annular gasket 21. As shown, the gasket 21 has a central chamber and substantially rectangular section and is positioned within the central recess. The amount of position holding or endwise compressing force that is exerted on the gasket 21 may be adjusted by adding or subtracting shims 17 between a front end mounting flange 11g of the housing and a front mounting flange portion of the closure sleeve 16. The sleeve 16 may be removably secured in position by a pair of peripherally spaced-apart mounting bolts 19 and their lock washers 18.

A centrally located, side boss portion 11e of the housing 11 is positioned in alignment with the central recess and has a threaded cross bore that extends and is open to the longitudinal bore of the housing. A locking or canting screw element 25 has a relatively coarse threaded stem that is adjustably carried within the boss portion 11e for, with a single turn, moving its beveled or wedge-shaped head or end 25a into and out of a combined spreading and canting relation between a pair of curved, spiral wings or encircling loops 20a of a flexible ring-like locking element 20. The element 20 may be of metal or reinforced resin construction and has a rectangular or square section. In addition to the pair of encircling loops or wings 20, the locking element has a connecting loop portion 20b and a pair of retention, half loop, turn, wing or end finger portions 20d. The loops 20a are, as shown, adapted to extend about or encircle opposite sides of a pipe member L to be held, and have a spring-like spiral relation to normally move to the position shown in FIG. 3 of the drawings.

An upstream end portion of a fluid delivering lance tube or pipe member L is adapted to be endwise slid into and out of the housing 11, along the bore of the closure sleeve 16 and the slide sleeve 15, to at its inner end, abut against a front end portion of primary gasket 13. The secondary gasket 21 is adapted to by-pass the lance L and serve as a back-up or supplemental sealing agency for any slight leakage that may occur from the standpoint of the primary gasket 13. As shown in FIGS. 2 and 3, the gasket 21 is centrally cut-out or chambered to serve as positioning recess portion for the locking element 20 and to also provide an annular pressure chamber for facilitating its sealing-off abutment with the outer surface of the pipe member or lance L and abutting front and back end and base surfaces of the recess within which it is positioned. As shown in FIG. 2, an inward turn of the locking screw 25 by means of its hand wheel 26 will spread the two halves of the locking element 20 apart into side abutment with the gasket 21, and simultaneously cant the convolutions or wings of the element 20 into a secure latching-holding engagement with the adjacent peripheral wall of the tubular lance L.

The single turn operation of the coupling device 10 enables a material shortening of the length of the screw 25, and the dual spreading action against normal closing tension of the ring-like element 20 provides a double bite on the lance L that cannot be displaced by a hard blow or jar against the coupling unit. Thus, no separate safety screw is needed. The two-turn ring element 20 has an easy release when the element 25 is withdrawn by one turn until the tip of head 25a clears or is substantially in-line with outer surfaces of the wings 20a and their connecting turns 20c with half loops, fingers or wings 20d of the locking element 20.

Applicant has devised a locking element 20 that has both a spring-like releasing action and a canted positive locking action. It has an angular or rectangular section (shown or square section) and is constructed to be spread and effectively turned or canted to serve as a locking ring. By devising a combined type of locking element 20, a so-called safety locking screw is no longer required and the canting or locking element 25 functions both as a locking means and a safety retention means. The construction also provides an improved fluid sealing-off action, in that the secondary gasket 21 supplements the functioning of the primary gasket 13 to provide a positive seal between the lance or pipe member L that is being held in position within the coupling unit 10. The central annular recess defined between the ends of the sleeve members 15 and 16 serves both as a positioning recess portion for the locking element 20 and the secondary gasket 21. The chamber portion of the gasket 21 defines a flexible immediate working area for the locking element 20. As shown in FIG. 2, side portions of the second gasket 21 are distorted by the canting spread of the wings 20l of the locking element 20 and make possible a maximum canted spread of the wings without side engagement or rubbing action against inner ends of the pair of sleeve-like members 15 and 16. The resiliency of the gasket 21 also furthers a quick, pipe member releasing return of the convolutions of the locking element 20 into close adjacency when the canting screw 25 is turned outwardly (see FIG. 3).

The pipe member or lance L may be simply and easily released by moving the hand wheel 26 an approximate one turn such that the wedge-shaped end portion 25a of the screw 25 is withdrawn sufficiently within the boss 11e to permit tension of the spread-apart wings 20a to cause them to move or close towards and into close adjacency with each other, out of canting engagement with the lance and within the confines of the gasket element 21. The compression seating of the secondary gasket 21 is easily adjustable by inserting or removing shims 17 between housing portion 11g and the closure sleeve or cap 16. By providing the screw 25 with relatively coarse threading, the amount of turning for advancing its end 25a into and out of locking position is minimized and the necessary length of the screw beyond the boss 11e is shortened. Overall, the construction enables the use of a simplified housing, a minimum number of easily assembled and disassembled parts, and positively eliminates escape of the fluid being carried from the coupling 10 to thus assure maximum safety of operation from the standpoint of the user.

The wings 20a of the locking ring 20 are connected together by a connecting portion 20b at a position that is in substantial opposite alignment with the head 25a of the screw 25 (see FIG. 3). The ring 20 is preferably of flexible, hardened steel construction and, as shown in FIG. 5a, may be provided with radius or rounded outer edges to facilitate entry of the head 25a of the stem 25 between portions thereof. When the ring section is canted, its sharp inner edges are adapted to securely fit into the pipe member or lance tube L that is being held. The gasket 21 which serves to position the ring 20 has, as shown in FIGS. 3 and 6, a relatively close-fitting, somewhat narrow, circumferentially extending groove portion 21a and an enlarged, relatively wider-spaced local operating area defining portion 21b. The portion 21a has a circular hole therein to by-pass the screw 25. The portion 21b permits the spread of the locking ring 20 and defines flow relief spacing for abutting portions of the gasket material that may be subjected to compression force by a widening expansion of the convolutions of the ring 20 when the screw 25 is employed to spread them. If desired, the ring 20 may be formed in such a manner that the wing portions 20a and 20d may have a slight spacing therebetween when the ring 20 is in ts relaxed or normal position of FIG. 3; this will further facilitate the entry of the head 25a of the stem 25 therebetween to spread and cant the wing portions to the position of FIG. 2.

I claim:

1. In a simplified positive latching and easily releasable fluid sealing-off coupling for connecting an end portion of a fluid delivering pipe member to a fluid supply line, a longitudinally extending coupling housing having a through-extending bore, connector means at a back end portion of the housing for securely connecting said bore to the fluid supply line, an annular gasket positioned within a back end portion of said bore adjacent said connector means, a pair of sleeve-like members along a forward end portion of said bore for slidably receiving a rear end portion of the pipe member in a longitudinally extending relation therein, means supporting said gasket in position within said bore to define a forwardly exposed end seat portion for a rear edge of the rear end portion of the pipe member, said pair of sleeve-like members defining a central recess portion therebetween within said bore, a ring-like locking element operatively carried within said recess portion and having a pair of spiral wings connected together at one end and adapted to curve about opposite sides of the pipe member to be held, said ring-like element having its wings connected in a flexibly held closely adjacent relation, a canting screw, a threaded boss on said housing in alignment with said recess portion for operatively receiving said canting screw, said canting screw having a canting head adapted to wedge between the wings of said ring-like element and force said wings apart into canted locking engagement with the pipe member positioned within said housing.

2. In a coupling as defined in claim 1, a second annular gasket positioned directly within said recess portion and adapted to have sealing engagement about the pipe member inserted within said housing, and said locking element being operatively carried within said recess portion in association with said second gasket.

3. In a coupling as defined in claim 2, said second gasket having a chamber portion therein to receive said locking element and operatively carry it within said recess portion.

4. In a coupling as defined in claim 2, said second gasket having an annular central chamber portion therein, said ring-like locking element being operatively positioned within said chamber portion, and said second gasket having a transverse opening in said chamber portion in alignment with said boss for passing the canting head of said canting screw therethrough to engage said ring-like element at a remote location with respect to the end connection between the spiral wings thereof.

5. In a coupling as defined in claim 1, the other ends of the wings of said locking element being connected to substantially half spirals, and being of substantially angular section to facilitate canted locking engagement with the pipe member.

6. In a coupling as defined in claim 2, said locking element being of substantially rectangular section to facilitate canted locking engagement with the pipe member.

7. In a coupling as defined in claim 2, said housing having an enlarged bore portion in alignment with said recess portion, an inner one of said pair of sleeve-like members having a flange lodged within said enlarged bore portion and extending backwardly along said bore into engagement with said first-mentioned gasket, and the second sleeve-like member of said pair extending forwardly from said recess portion along said bore and having an outwardly projecting flange, and means cooperating with said flange to secure said second sleeve-like member in position within said bore of said housing.

8. In a coupling as defined in claim 2, a positioning sleeve of angle shape carried within the back end portion of said housing for retaining said first-mentioned gasket in position within said bore and exposing a front end of said gasket for abutment with the back edge of the pipe member inserted within the bore of said housing, and said second gasket providing a supplemental seal for the joint defined between the pipe member and said pair of sleeve-like members.

9. In a coupling as defined in claim 2, said ring-like locking element being positioned substantially centrally within said second gasket and having the connecting portion between the one end of its pair of wings carried in a substantially remotely opposed relation with respect to said canting screw, and having a pair of half loop finger portions at the other end of its said wings that are adapted to extend about the pipe member being held and that lie in a substantially immediate opposed relation with respect to said canting screw.

10. In a coupling as defined in claim 9, said locking element being of substantially rectangular section, and said canting head being adapted to simultaneously spread said wings of said locking element apart and turn them into canted engagement with the pipe member.

11. In a coupling as defined in claim 10, a forward one of said pair of sleeve-like members being positioned along the bore of said housing to retain said second gasket within said recess portion, shim means between said forward sleeve-like member and said housing for adjusting longitudinal positioning of said member along the bore to increase and decrease holding force exerted thereby upon said second gasket, and means for securing said outer sleeve-like member to said housing.

* * * * *